Figures 1, 2:
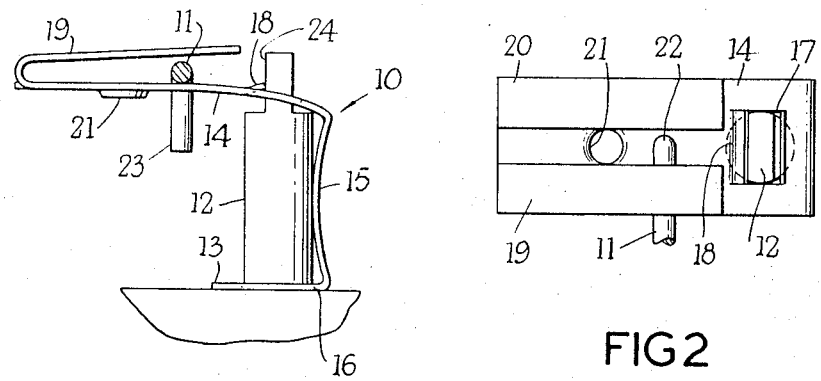

Feb. 6, 1968     C. A. SECKERSON ET AL     3,367,203
CABLE CONTROL CLIP AND ASSEMBLY
Filed March 3, 1966

INVENTORS.
Clifford Alexander Seckerson
Edward Harry Frederick Ferguson
George Noel Crowther
by Philip E. Parker
Attorney

United States Patent Office 3,367,203
Patented Feb. 6, 1968

3,367,203
CABLE CONTROL CLIP AND ASSEMBLY
Clifford Alexander Seckerson, Iver Heath, Edward Harry Frederick Ferguson, Harefield, and George Noel Crowther, Hillingdon, England, assignors to United-Carr Incorporated, Boston, Mass., a corporation of Delaware
Filed Mar. 3, 1966, Ser. No. 531,495
Claims priority, application Great Britain, Mar. 8, 1965, 9,725/65
6 Claims. (Cl. 74—469)

The present invention relates to an improved clip which is particularly but not exclusively suitable for use in linking a cable to a shaft.

It is an object of the present invention to provide a clip which will link a cable to a shaft formed with a flat in such a manner that the cable is pivotable relative to the clip while the clip is non-rotatable relative to the shaft.

It is a further object of the invention to provide a clip for this purpose which is cheap to manufacture in mass production and which is easy to assemble.

It is also an object of the present invention to provide means for linking two spaced rotatable shafts, each of which is formed with a flat, for co-rotation by actuation of a single control cable.

According to the invention there is provided a clip for linking a cable to a shaft formed with a flat the clip comprising a generally flat, apertured base, a bowed web extending upwardly from one end of the base, an arm extending outwardly from the upper end of the web and provided with a hole aligned with the said aperture in the base whereby the said shaft may be passed through the base and the arm when the base and arm are pinched together into generally parallel relationship, means on the clip adapted, in cooperation with the said flat on the shaft, to prevent relative rotation between the clip and the shaft and to resist withdrawal of the clip from the shaft, there being provided an aperture in the arm, the said aperture in the arm being spaced from the said hole and adapted to receive a bent end of said cable and an extension of the said arm which is reversely bent so as to overlie the arm and retain the bent end of the cable in the said aperture in the arm.

According to a further aspect of the invention there is also provided an assembly of two rotatable shafts formed with flats linked together for co-rotation with the aid of two clips and a link, each clip comprising an apertured base, a bowed web extending upwardly from one end of the base and an arm extending outwardly from the upper end of the web, the arm being formed with a hole, one of the shafts extending through the aperture in the base and the hole in the arm of each clip with the web tensioned thereby, means being provided on each clip cooperatively engaged with the flat on each shaft to prevent relative rotation between the clip and the shaft and to resist withdrawal of the clip from the shaft, an aperture being provided in the arm of each clip and a link having cranked ends being engaged respectively in the said apertures in the arms of the two clips to link the clips together for co-rotation and there being also provided an extension on the arm of each clip which is reversely bent so as to overlie the said arm and retain the cranked end of the link in the aperture therein.

Figure 3:
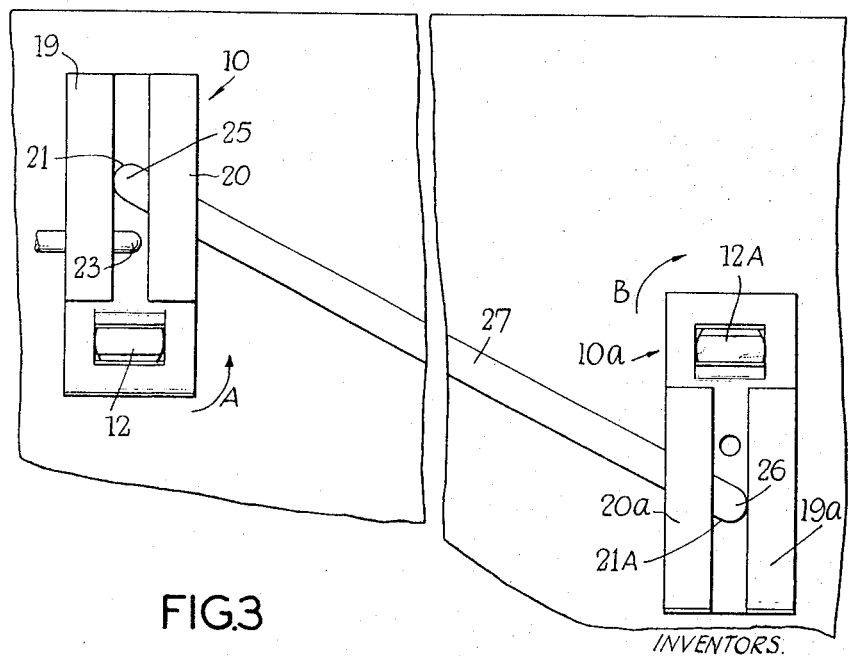

A preferred form of the invention will now be described with reference to the accompanying diagrammatic drawings, in which:

FIGURE 1 is an elevation of a clip according to the invention secured on a shaft, FIGURE 2 is a plan view of FIGURE 1, and FIGURE 3 is a plan view of heater control mechanism including two of the clips of FIGURES 1 and 2.

In FIGURES 1 and 2 a clip which is indicated generally at 10, is shown securing a control cable 11 to a shaft 12.

The clip 10 is formed from a single strip of metal, which is preferably rendered resilient and rustproof after being manufactured to the shape shown, and comprises a generally flat base 13 and an arm 14 joined by a bowed web 15.

The base 13 is formed with a circular aperture 16 adapted to pass over the shaft 12 and the arm 14 is formed with a rectangular hole 17 which is aligned with the aperture 16 in the base 13. A resilient square ended lug 18, which is provided with a flat end edge, is sheared and bent up from the arm 14 so as to extend away from the base 13 and project into the hole 17.

Two spaced extensions 19 and 20 of the arm 14 are reversely bent so as to overlie the arm 14 but stop short of the lug 18. In the gap between the spaced extensions 19 and 20 the arm 14 is formed with a first circular aperture 21 and a second circular aperture 22 of smaller diameter than the aperture 21.

In order to attach the cable 11 to the shaft 12 an end 23 of the cable is bent through 90° and passed through the aperture 22 in the arm 14. The base 13 and arm 14 are then passed over the shaft 12 so that the shaft 12 extends through the aperture 16 in the base 13 and the hole 17 in the arm 14. The web 15 of the clip is bowed and the base 13 and arm 14 are normally splayed apart so that the web has to be flattened slightly, by pinching the base 13 and arm 14 together, in order to pass the upper end of the shaft through the hole 17. Thus the web is permanently under tension and holds the lug 18 in firm engagement against the flat 24. As the shaft passes through the hole 17, the lug 18 rides over the flat 24 and is bent upwardly so as to allow the arm 14 to pass downwardly over the shaft, but once the arm 14 is pressed fully home on the shaft the lug 18 bites into the flat 24 to resist removal of the arm 14.

In the assembled position the lug 18 engages the flat 24 and keys the clip 10 to the shaft so that movement of the cable 11 will rotate the clip 10 which in turn rotates the shaft 12.

In order to remove the clip from the shaft the base 13 and arm 14 are pinched together so as to draw the lug 18 away from the shaft. The clip can then be drawn upwardly off the shaft.

In one particular application two of the clips 10 are used, as shown in FIGURE 3 to control the vents of a vehicle heater.

In FIGURE 3, two vertically arranged shafts 12, 12a carry the vents which are not shown, of a vehicle heater. Ends 25 and 26 of a relatively heavy gauge wire link 27 are bent and attached through the apertures 21, 21a of the clips 10, 10a respectively and the end 23 of the control cable 11 is attached to the aperture 22 of the clip 10.

The two clips 10, 10a are then attached, in the manner already described, to the shafts 12, 12a respectively so that movement of the control wire 11 rotates the clip 10 and shaft 12 in the direction of the arrow A to close the vent attached to the shaft 12, and through the link wire 27 the clip 10a and shaft 12a are simultaneously rotated in the direction of the arrow B to open the vent attached to the shaft 12a.

It will be seen that, in the assembled position the control cable 11 and the link wire 27 pass beneath the spaced extensions 19, 20 of the fastener 10 and are thus prevented from accidentally coming out of the aperture 21 and aperture 22 respectively so long as the clip is attached to the shaft 12.

Similarly the link wire 27 passes under the extensions 19a, 20a of the clip 10a.

It will be understood that further modifications may be made to the embodiments described above without departing from the spirit and scope of the invention which is best defined by the following claims.

What we claim is:

1. A clip for linking a cable to a shaft formed with a flat the clip comprising a generally flat, apertured base, a bowed web extending upwardly from one end of the base, an arm extending outwardly from the upper end of the web and provided with a hole aligned with the said aperture in the base whereby the said shaft may be passed through the base and the arm when the base and the arm are pinched together into generally parallel relationship, means on the clip adapted in cooperation with the said flat on the shaft, to prevent relative rotation between the clip and the shaft and to resist withdrawal of the clip from the shaft, there being provided an aperture in the arm, the said aperture in the arm being spaced from the said hole and adapted to receive a bent end of said cable and an extension of the said arm which is reversely bent so as to overlie the arm and retain the bent end of the cable in the said aperture in the arm.

2. A clip as claimed in claim 1, in which the said reversely bent extension is slotted lengthwise into two portions.

3. A clip as claimed in claim 2, in which the said means on the clip comprises a resilient lug projecting from the arm and provided with a flat end edge projecting into the said hole in the arm and adapted to bear against the said flat on the shaft to prevent relative rotation between the clip and the shaft and to resist withdrawal of the clip from the shaft.

4. An assembly of two rotatable shafts formed with flats linked together for co-rotation with the aid of two clips and a link, each clip comprising an apertured base, a bowed web extending upwardly from one end of the base and an arm extending outwardly from the upper end of the web, the arm being formed with a hole, one of the shafts extending through the aperture in the base and the hole in the arm of each clip, with the web tensioned thereby, means being provided on each clip cooperatively engaged with the flat on each shaft to prevent relative rotation between the clip and the shaft and to resist withdrawal of the clip from the shaft, an aperture being provided in the arm of each clip and a link having cranked ends being engaged respectively in the said apertures in the arms of the two clips to link the clips together for co-rotation and there being also provided an extension on the arm of each clip which is reversely bent so as to overlie the said arm and retain the cranked end of the link in the aperture therein.

5. An assembly as claimed in claim 4, in which the arm of at least one of the clips is operatively connected to a control member for co-rotating the clips and thereby the shafts.

6. An assembly as claimed in claim 4, in which the arms of the two clips project generally in parallel and to opposite sides of a line joining the axes of the two shafts.

References Cited
UNITED STATES PATENTS 2,711,635   6/1955   Rockwell _____ 74—548 X MILTON KAUFMAN, *Primary Examiner.*